US005324895A

United States Patent [19]
Inamori et al.

[11] Patent Number: 5,324,895
[45] Date of Patent: Jun. 28, 1994

[54] PRESSURE SENSITIVE COORDINATE INPUT DEVICE WITH IMPROVED VOLTAGE REGULATION

[75] Inventors: Yoshimitsu Inamori, Nara; Kohichi Oda, Sakai; Naoki Shiraishi, Shiki, all of Japan

[73] Assignee: Sharp Kabushiki Kaisha, Osaka, Japan

[21] Appl. No.: 883,262

[22] Filed: May 14, 1992

[30] Foreign Application Priority Data

May 15, 1991 [JP] Japan ................... 3-110596

[51] Int. Cl.$^5$ .............................................. G08C 21/00
[52] U.S. Cl. ........................................ 178/18; 178/20
[58] Field of Search ............................ 178/18, 19, 20; 340/712; 345/173–178

[56]     References Cited
U.S. PATENT DOCUMENTS

| | | | |
|---|---|---|---|
| 3,885,097 | 5/1975 | Pobgee | 178/18 |
| 4,386,232 | 5/1983 | Slater | 178/18 |
| 5,008,497 | 4/1991 | Asher | 178/18 |

FOREIGN PATENT DOCUMENTS 61-131112  6/1986  Japan .

Primary Examiner—Stephen Chin
Assistant Examiner—Paul Loomis
Attorney, Agent, or Firm—Nixon & Vanderhye

[57]     ABSTRACT

The invention provides a coordinates input device capable of detecting coordinates with high accuracy by eliminating errors that could be contained in detected voltage depending on the condition of the pressure applied to a coordinates input section. When pressure is applied to a plane resistive sheet of the coordinates input section, the maximum voltage applied to the coordinates input section is detected by means of an A/D converter prior to the detection of the coordinates, and correction is made by a reference voltage regulating circuit so that a reference voltage becomes equal to the maximum voltage. Thereafter, the A/D converter converts the detected voltage to digital data on the basis of the corrected reference voltage, for calculation of the coordinates. Errors that could be contained in the detected voltage when detecting the coordinates can thus be eliminated.

6 Claims, 6 Drawing Sheets

PRESSURE SENSITIVE COORDINATE INPUT DEVICE WITH IMPROVED VOLTAGE REGULATION

BACKGROUND OF THE INVENTION

1. Field of the Invention

The present invention relates to a coordinates input device such as a pressure sensitive tablet or the like wherein the position of a pressed point is detected when two spaced apart and oppositely disposed resistive sheets are pressed together by a pen or a finger, and also to a method for such a device.

2. Description of the Related Art

It is generally known to provide a coordinates input device called a tablet as input means for information processing apparatus such as a personal computer or a word processor. Such a tablet is used to input positions, characters, graphics, etc. Various types of tablets have heretofore been proposed, several of which, for example, pressure sensitive type, electromagnetic induction type, electrostatic induction type, etc. have already been put into practical use. Among others, the pressure sensitive type tablet has achieved widespread use because of its simplicity in construction.

FIG. 1 is a circuit diagram showing the basic configuration of a prior art pressure sensitive coordinates input device 1. The coordinates input device 1 comprises: a coordinates input section (pressure sensitive tablet) 2 which is pressed by the operator; an A/D converter 3 which detects the potentials of the electrodes (to be hereinafter described) provided in the coordinates input section 2; and a central processing unit (CPU) 4 which controls the supply voltage for the coordinates input section 2 and which, based on the output from the A/D converter 3, detects the coordinates of a point entered on the coordinates input section 2.

The coordinates input section 2 includes plane resistive sheets 5 and 6 whose surfaces are formed from uniform plane resistive material such as indium oxide. Along the opposite edges of the plane resistive sheets 5 and 6, there are provided electrodes XLa, XHa and YLa, YHa which are formed from silver paste or the like. The plane resistive sheets 5 and 6 are disposed so that the electrodes of one of the plane resistive sheets extend at right angles with the electrodes of the one of the plane resistive sheets.

The resistance of the plane resistive sheets 5 and 6 are generally in the order of several hundred ohms, the resistance between the electrodes XLa and XHa being designated by Rx and the resistance between the electrodes YLa and YHz by Ry.

When the plane resistive sheet 6, which serves as an input plane of the coordinates input section 2, is not touched with a pen or a finger, the two plane resistive sheets 5 and 6 are slightly separated by a spacer or the like, thus keeping the plane resistances of the plane resistive sheets 5 and 6 from contacting each other.

Switching elements SxL, SxH, SyL, and SyH are connected to the electrodes XLa, XHa, YLa, and YHa, respectively. The CPU 4 controls these switching elements to switch the electrodes XLa, YLa between a low level (ground potential) and a high impedance state and the electrodes XHa, YHa between a high level (+5 V in this example) and a high impedance state.

With this configuration, it is possible not only to put the plane resistance of the plane resistive sheet 5 in a high impedance state by putting the electrodes XLa and XHa both in a high impedance state, but also to provide a gradient potential to the plane resistance by setting the electrode XLa low and XHa high. This also applies to the electrodes YLa and YHa.

Let us now consider the situation where the plane resistive sheets 5 and 6 of the coordinates input section 2 are brought into contact with each other at a pressing point Pi. In this situation, when the switching elements SxL and SxH are both turned on to set the electrode XLa low (at ground potential) and XHa high (at +5 V) and the switching elements SyL and SyH are both turned off to put the corresponding electrodes in the high impedance state, the potential at the electrode YLa represents the potential at the contact point Pi. Under these circumstances, when the resistance from the electrode XLa to the contact point Pi is denoted as Rx1 and the resistance from the contact point Pi to the electrode XHa as Rx2, the potential at the contact point Pi represents the potential at which 5 V is divided in the ratio of Rx1:Rx2. The x coordinate of the contact point Pi can thus be computed.

Next, when the switching elements SyL and SyH are both turned on to set the electrode YLa low (at ground potential) and YHa to high (at +5 V) and the switching elements SxL and SxH are both turned off to put the corresponding electrodes in the high impedance state, the potential at the electrode XLa represents the potential at the contact point Pi. When the resistance from the electrode YLa to the contact point Pi is denoted as Ry1 and the resistance from the contact point Pi to the electrode YHa as Ry2, the potential at the contact point Pi represents the potential at which 5 V is divided in the ratio of Ry1:Ry2. The y coordinate of the contact point Pi can thus be computed.

The potentials at the electrodes XLa and YLa are detected by the A/D converter 3 having a relatively high input impedance, the potentials then being converted to digital data and supplied to the CPU 4. The CPU 4 thus computes the x and y coordinates of the contact point Pi on the basis of the potentials of the electrodes XLa and YLa.

In the above coordinates input device 1, the reference voltage VREF for the A/D converter 3 is set at a fixed level of +5 V which is equal to the supply voltage for the electrodes XHa and YHa of the coordinates input section 2.

Generally, in a pressure sensitive tablet, even when the same point is pressed, the resulting resistances slightly vary depending on the condition of the pressure. The resistance variations result in variations in the voltages VINX and VINY input to the A/D converter 3. The voltage VINX is a voltage measured along the x-axis and the voltage VINY a voltage measured along the y-axis.

Since the A/D converter 3 performs conversion based on the fixed reference voltage VREF, errors are inevitably contained in data DI0–DI7. Such low-resistance variations are a problem inherent in the coordinates input section 2, and it is not possible to reduce or completely eliminate the variations.

To overcome this problem, a method is proposed wherein the measured voltages are corrected by software processing by the CPU 4. In this method, when pressure is applied to the coordinates input section 2, first the switching element SxH alone is turned on to supply 5 V to the electrode XHa. This sets the electrode YLa to a high level, the potential of which is measured to provide an x-axis correction voltage VINX1. Therefore, the x-axis correction value XSET is obtained by the following equation 1.

$$XSET = VINX1/5 \text{ (V)} \quad \text{[Equation 1]}$$

Then, the x-axis corrected voltage VINXf is obtained by the following equation 2.

$$VINXf = XSET \times VINX \quad \text{[Equation 2]}$$

Next, the switching element SyH alone is turned on to set the electrode YHa at 5 V. This sets the electrode XLa to a high level, the potential of which is measured to provide a y-axis correction voltage VINY1. Therefore, the y-axis correction value YSET is obtained by the following equation 3.

$$YSET = VINY1/5 \text{ (V)} \quad \text{[Equation 3]}$$

Then, the y-axis corrected voltage VINYf is obtained by the following equation 4.

$$VINYf = YSET \times VINY \quad \text{[Equation 4]}$$

However, according to such correction by software, since corrections are made for both x- and y-axis for every data sampling, an appreciable time is spent in calculation, and therefore, this method is not effective unless the operating speed of the CPU 4 is fast enough.

SUMMARY OF THE INVENTION

It is an object of the invention to provide a coordinates input device and a method for the device whereby coordinates can be detected with high accuracy.

The invention provides a coordinates input device which includes a coordinates input section comprising a pair of plane resistive sheets having electrodes formed along opposite edges thereof, the plane resistive sheets being disposed so that the electrodes of one of the plane resistive sheets extend at right angles with the electrodes of the other one of the plane resistive sheets and so that the plane resistive sheets are brought into contact with each other when pressure is applied to any point on one of the plane resistive sheets, wherein the first and second electrodes of each of the plane resistive sheets are respectively connected to a predetermined reference potential and a ground potential through switching means, the switching means being so controlled as to provide a gradient potential to one of the plane resistive sheets while placing the switching means connected to the other one of the plane resistive sheet in a high impedance state, whereupon the potential of the plane resistive sheet connected to the switching means placed in the high impedance state is detected, based upon which the coordinates of the pressed point are calculated, the coordinates input device comprising:

analog-digital converting means which detects the potential of the plane resistive sheet placed in the high impedance state for calculation of the coordinates and which converts the potential to digital data on the basis of the reference potential;

said analog to digital converter also detecting, prior to the calculation of the coordinates, the maximum potential applied to the coordinates input section when the plane resistive sheets are pressed together; and reference potential regulating means for regulating the reference potential supplied to the analog-digital converting means to the same level as the maximum potential.

According to the invention, when pressure is applied to any point on the coordinates input section, the maximum voltage applied to the coordinates input section is detected and the reference potential supplied to the analog-digital converting means is regulated to the same level as the maximum potential, based upon which the coordinates of the pressed point are calculated. More specifically, in the coordinates input section, when the plane resistive sheets are pressed together, usually a slightly lower potential than the predetermined reference potential (the slightly lower potential being the maximum potential measured at the time of pressure application) is applied to the plane resistive sheet placed in the high impedance state, the maximum potential varying depending on the condition of the applied pressure. Therefore, by regulating the reference potential for the analog-digital converting means to the same level as the maximum potential, errors can be eliminated from the detected potential value of the plane resistive sheet.

As described above, according to the invention, when pressure is applied to any point on the coordinates input section, the maximum voltage applied to the coordinates input section is detected and the reference potential supplied to the analog-digital converting means is regulated to the same level as the maximum potential, based upon which the coordinates of the pressed point are calculated. More specifically, in the coordinates input section, when the plane resistive sheets are pressed together, usually a slightly lower potential than the predetermined reference potential is applied to the plane resistive sheet placed in the high impedance state, the maximum potential varying depending on the condition of the applied pressure. Therefore, by regulating the reference potential for the analog-digital converting means to the same level as this maximum potential, errors can be eliminated from the detected potential value of the plane resistive sheet. This assures highly accurate detection of the coordinates.

In one aspect of the invention, the reference potential regulating means comprises:

a plurality of resistors having different resistances and connected in series in increasing order of resistance;

a plurality of switching elements connected respectively in parallel with the plurality of resistors;

a memory for storing control data used for controlling the on/off operations of the plurality of switching elements; and a control circuit for controlling the plurality of switching elements on the basis of the control data stored in the memory, wherein the reference potential is applied to one end of the smallest resistance resistor of the plurality of resistors and the potential at one end of the largest resistance resistor is supplied as the maximum potential to the analog-digital converting means.

In another aspect of the invention, the plurality of switching elements each consists of a p-channel transistor and an n-channel transistor paired together.

In a further aspect of the invention, the maximum potential detecting means detects the potential at the second electrode of one of the plane resistive sheets when the first electrode of the one plane resistive sheet is set at the reference potential and the second electrode of the other one of the plane resistive sheets is set at the ground potential.

The invention also provides a coordinates input method wherein a coordinates input section is provided comprising a pair of plane resistive sheets having electrodes formed along opposite edges thereof, the plane resistive sheets being disposed so that the electrodes of one of the plane resistive sheets extend at right angles with the electrodes of the other one of the plane resistive sheets and so that the plane resistive sheets are brought into contact with each other when pressure is applied to any point on one of the plane resistive sheets, wherein the first and second electrodes of each of the plane resistive sheets are respectively connected to a predetermined reference potential and a ground potential through switching means, the switching means being so controlled as to provide a gradient potential to one of the plane resistive sheets while placing the switching means connected to the other one of the plane resistive sheet in a high impedance state, whereupon the potential of the plane resistive sheet connected to the switching means placed in the high impedance state is detected, based upon which the coordinates of the pressed point are calculated, the coordinates input method comprising the steps of:

detecting, prior to the calculation of the coordinates, the maximum potential applied to the coordinates input section when the plane resistive sheets are pressed together;

detecting the potential of the plane resistive sheet placed in the high impedance state for calculation of the coordinates;

converting the detected potential to digital data on the basis of the maximum potential; and calculating the coordinates of the pressed point on the basis of the digital data.

In one aspect of the invention, when the first electrode of one of the plane resistive sheets is set at the reference potential and the second electrode of the other one of the plane resistive sheets is set at the ground potential, the potential at the second electrode of the one plane resistive sheet is detected as the maximum potential.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
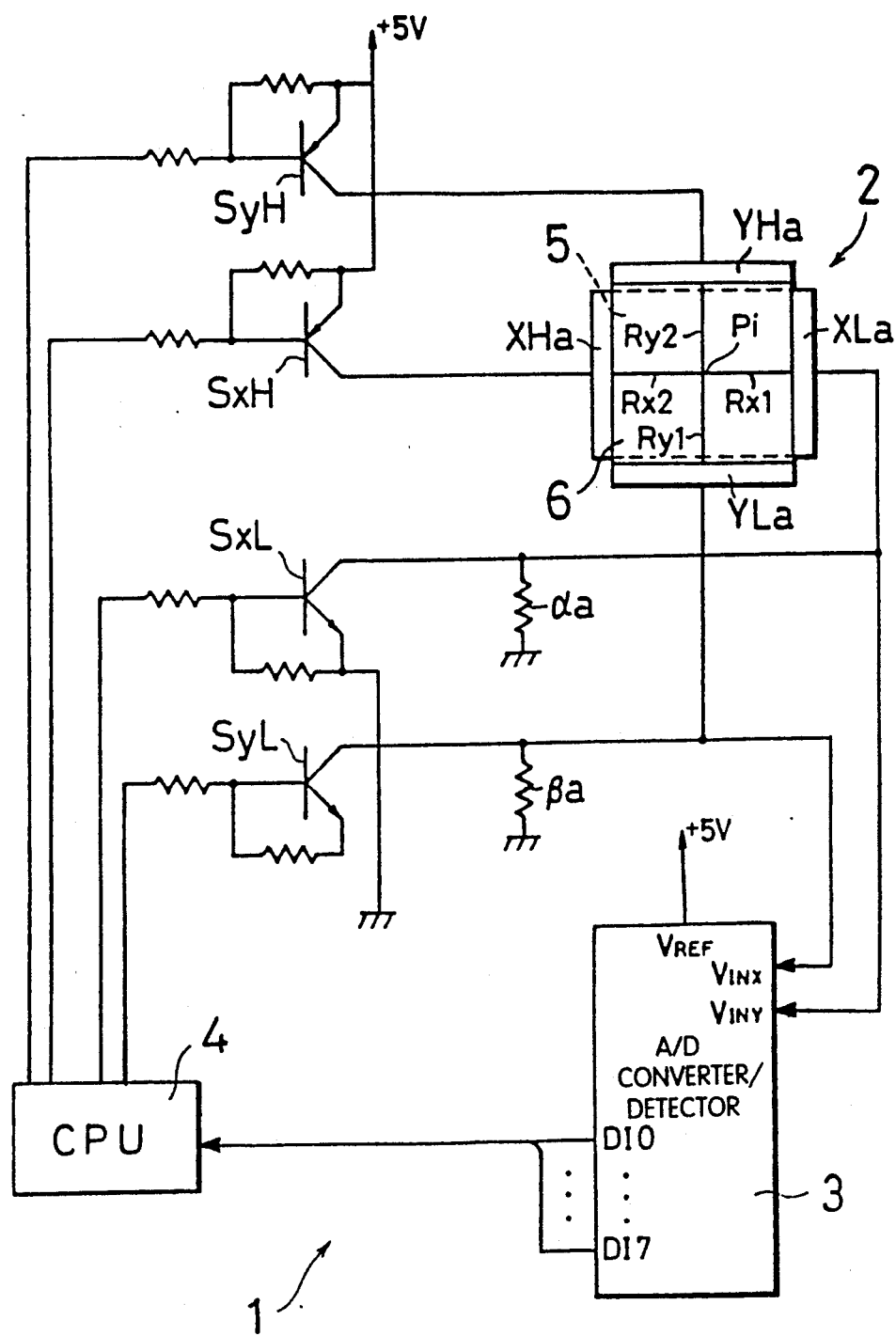
FIG. 1 is a circuit diagram showing the configuration of a prior art coordinates input device 1.

Now referring to the drawing, preferred embodiments of the invention are described below.

Figure 2:
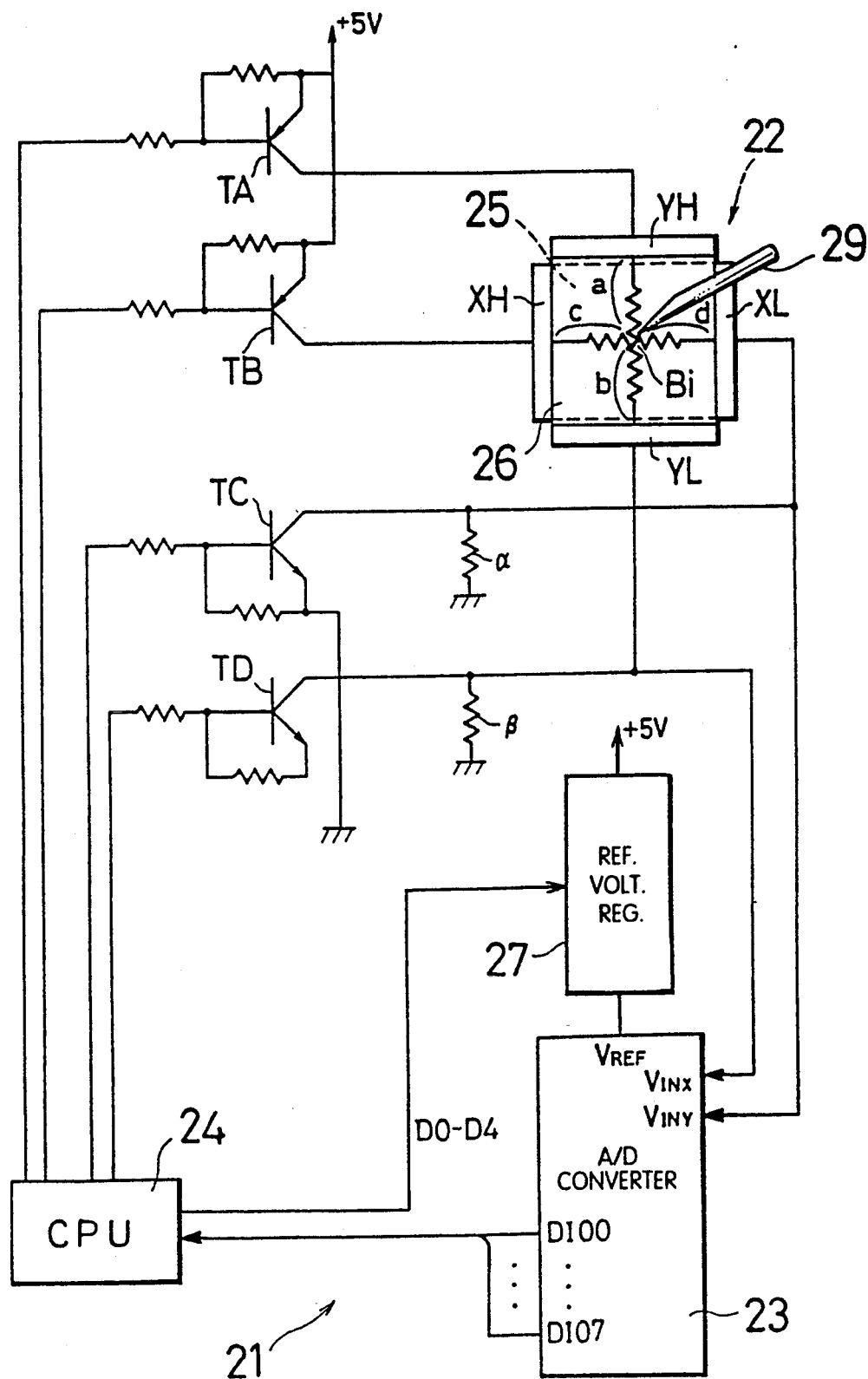
FIG. 2 is a circuit diagram showing the configuration of a coordinates input device 21 in one embodiment of the invention.

FIG. 2 is a circuit diagram showing the configuration of a coordinates input device 21 in one embodiment of the invention. In the coordinates input device 21 of this invention, there is provided a reference voltage regulating circuit 27 for regulating the reference voltage for an A/D converter 23.

The coordinates input device 21 comprises: a coordinates input section (pressure sensitive tablet) 22 which is pressed by the operator; the A/D converter 23 which detects the potentials of the electrodes (to be hereinafter described) provided in the coordinates input section 22; and a central processing unit (CPU) 24 which controls the supply voltage for the coordinates input section 22 and which, based on the output from the A/D converter 23, detects the coordinates of a point entered on the coordinates input section 22.

The coordinates input section 22 includes plane resistive sheets 25 and 26 whose surfaces are formed from uniform resistive material such as indium oxide. Along the opposite edges of the plane resistive sheets 25 and 26, there are provided electrodes XL,XH and YL,YH which are formed from silver paste or the like. The plane resistive sheets 25 and 26 are disposed so that the electrodes of one of the plane resistive sheets extend at right angles with the electrodes of the other one of the plane resistive sheets.

The resistances of the plane resistive sheets 25 and 26 are generally in the order of several hundred ohms, the resistance between the electrodes XL and XH being designated by Rx and the resistance between the electrodes YL and YH by Ry.

When the plane resistive sheet 26, which serves as an input surface of the coordinates input section 22, is not touched with a pen 29 or the like, the two plane resistive sheets 25 and 26 are slightly separated by a spacer or the like, thus keeping the plane resistances of the plane resistive sheets 25 and 26 from contacting each other.

Switching elements TC, TB, TD, and TA are connected to the electrodes XL, XH, YL, and YH, respectively. The CPU 4 controls these switching elements to switch the electrodes XL, YL between a low level (ground potential) and a high impedance state and the electrodes XH, YH between a high level (+5 V in this example) and a high impedance state.

With this configuration, it is possible not only to put the resistance of the plane resistive sheet 25 in a high impedance state by putting the electrodes XL and XH both in a high impedance state, but also to provide a gradient potential to the resistance by setting the electrode XL low and XH high. This also applies to the electrodes YL and YH.

Let us now consider the situation where the plane resistive sheets 25 and 26 of the coordinates input section 22 are brought into contact with each other with pressure applied to a pressing point Bi by the pen 29. In this situation, when the switching elements TC and TB are both turned on to set the electrode XL low (at ground potential) and XH high (at +5 V) and the switching elements TD and TA are both turned off to put the corresponding electrodes in the high impedance state, the potential at the electrode YL represents the potential at the contact point Bi. Under these circumstances, when the resistance from the electrode XL to the contact point Bi is denoted as d and the resistance from the contact point Bi to the electrode XH as c, the potential at the contact point Bi represents the potential at which 5 V is divided in the ratio of d:c. The x coordinate of the contact point Bi can thus be computed.

Next, when the switching elements TD and TA are both turned on to set the electrode YL low (at ground potential) and YH high (at +5 V) and the switching elements TC and TB are both turned off to put the corresponding electrodes in the high impedance state, the potential at the electrode XL represents the potential at the contact point Bi. When the resistance from the electrode YL to the contact point Bi is denoted as b and the resistance from the contact point Bi to the electrode YHa as a, the potential at the contact point Bi represents the potential at which 5 V is divided in the ratio of b:a. The y coordinate of the contact point Bi can thus be computed.

The potentials at the electrodes XL and YL are detected by the A/D converter 23 having a relatively high input impedance, the potentials then being converted to digital data and supplied to the CPU 24. The CPU 24 thus computes the x and y coordinates of the contact point Bi on the basis of the potentials of the electrodes XL and YL.

Figure 3A:
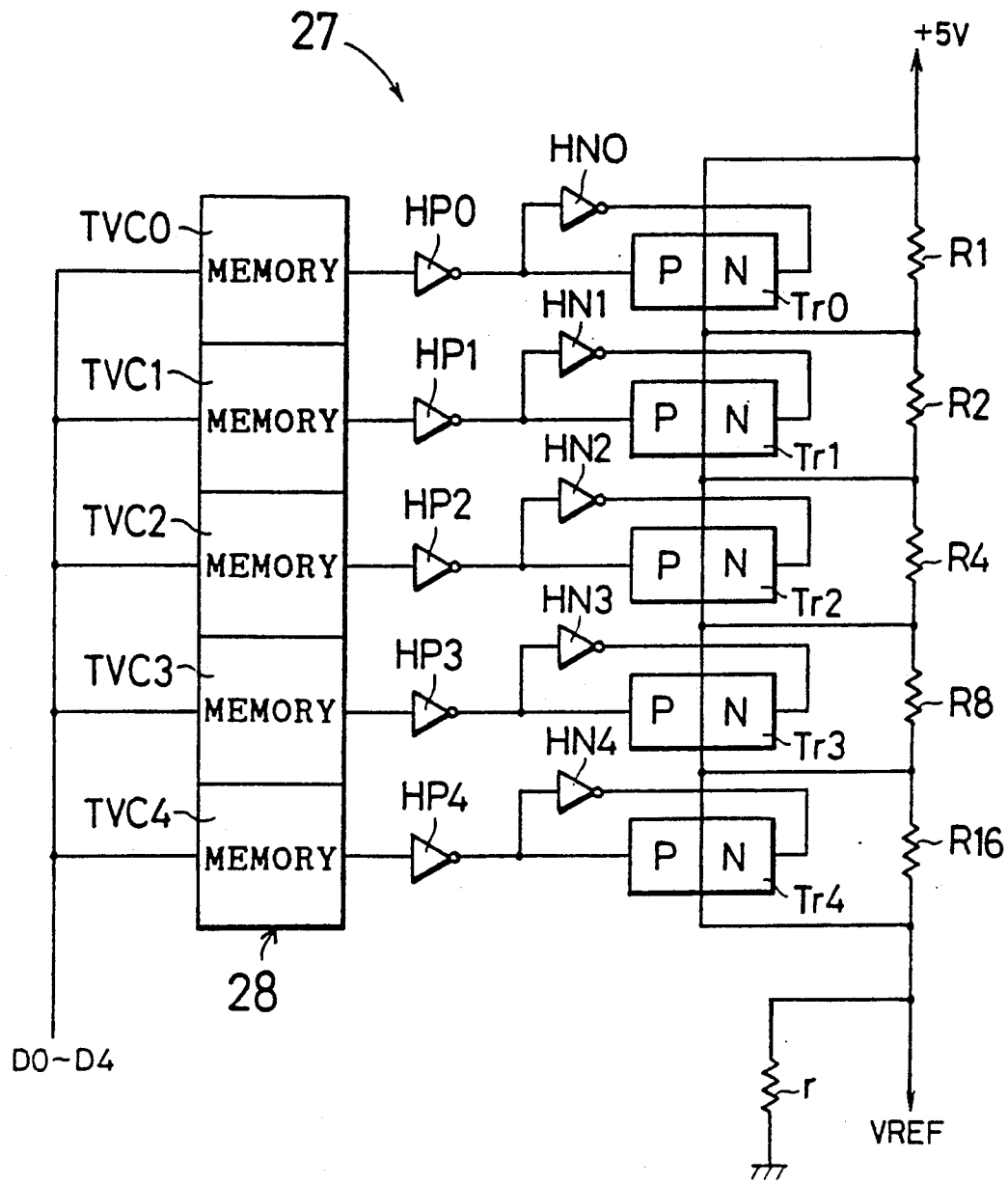
FIGS. 3(1) and 3(2) are circuit diagrams showing the configuration of a reference voltage regulating circuit 27 contained in the coordinates input device 21 of FIG. 2.
Figure 3B:
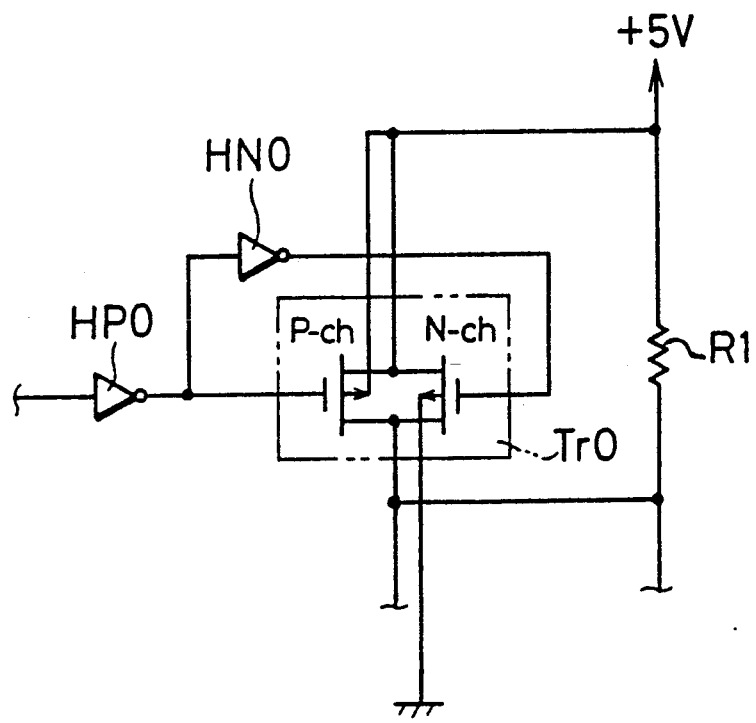

FIG. 3 is a circuit diagram showing the configuration of the reference voltage regulating circuit 27. As shown in FIG. 3(1), the reference voltage regulating circuit 27 comprises: resistors R1, R2, R4, R8, and R16 for limiting the level of a reference voltage VREF; tablet voltage regulating transistors Tr0–Tr4 connected in parallel with the respective resistors; a voltage correcting register 28 for storing control data used for controlling the on/off operations of the transistors Tr0–Tr4; inverters HP0–HP4 and HN0–HN4 through which the control data from the register 28 are supplied to the transistors Tr0–Tr4; and a resistor r.

The numerals 1, 2, 4, 8, and 16 appended to the reference sign R for the resistors designate the ratio of resistance values between each resistor; for example, the resistance value of the resistor R16 is 16 times that of the resistor R1 and four times that of the resistor R4.

As shown in FIG. 3(2), the tablet voltage regulating transistor Tr0 consists of an n-channel transistor (designed by "N" in FIG. 3(1)), which is turned on when the gate is set high, and a p-channel transistor (designed by "P" in FIG. 3(1)) which is turned on when the gate is set low. When data "1" is placed in a memory cell TVC0 of the register 28, a high level voltage is applied to the n-channel transistor and a low level voltage to the p-channel transistor; as a result, the transistor Tr0 conducts and no current flows through the resistor R1. Conversely, when data "0" is placed in the memory cell TVC0, a low level voltage is applied to the n-channel transistor and a high level voltage to the p-channel transistor; as a result, the transistor Tr0 is placed in an off state, allowing current to flow through the resistor R1. The transistors Tr1–Tr4 operate in the similar manner to the transistor Tr0.

Therefore, in the initial state, data "1" is placed in the respective memory cells TVC0–TVC4 of the register 28, so that all the transistors Tr0–Tr4 are allowed to conduct and no current flows through any one of the resistors R1, R2, R4, R8, or R16. Therefore, 5 V as the reference voltage VREF is supplied to the A/D converter 23. In the description below, the data stored in the memory cells TVC0–TVC4 is designated, for example, by "11111".

After the initial state is set, when pressure is applied to the coordinates input section 22, the data stored in the register 28 is changed in accordance with the procedure to be hereinafter described, thereby controlling the on/off operations of the transistors Tr0–Tr4 so that current is shunted away from the selected resistor or resistors R1, R2, R4, R8, or R16, for regulation of the reference voltage VREF.

The procedure requires that the value of the VREF voltage be previously measured (calculated) for each combination of data stored in the register 28. Based on the thus measured data, a table is created and is loaded into the CPU 24 so that the table is looked up for calculation of coordinates in accordance with the procedure hereinafter described. Table 1 below is an example of such a table.

TABLE 1

| Voltage correcting register | Effective register | VREF voltage |
|---|---|---|
| 11111 | None | 5(V) |
| 01010 | 1R,4R,16R | 5(V)xr/{(1R+4R+16R)+r} |
| 00000 | 1R,2R,4R,8R,16R | 5(V)xr/{(1R+2R+4R+8R+16R)+r} |

Generally, the reference voltage VREF is expressed by the following equation 5.

$$VREF = 5\ (V) \times r / \{(nR) + r\} (n = 0\ \text{to}\ 31) \qquad \text{[Equation 5]}$$

Therefore, for calculation of coordinates, the value "n" is determined so that the reference voltage VREF becomes equal to the correction voltages VINX1 and VINY1 to be hereinafter described.

Figure 4:
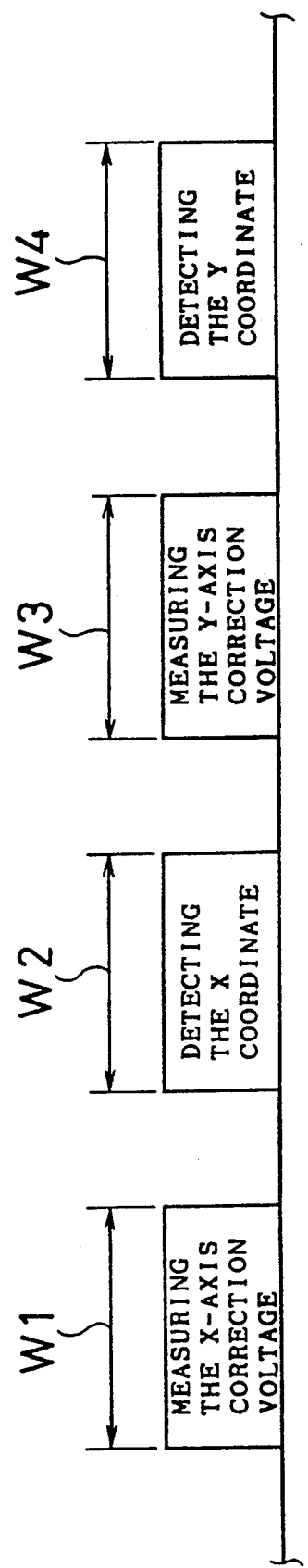
FIG. 4 is a timing chart explaining the coordinates detection operation of the coordinates input device 21.

FIG. 4 is a timing chart explaining the coordinates detection operation of the coordinates input device 21. The period W1 is the period for measuring the x-axis correction voltage VINX1. During the period W1, first the transistor TB alone is allowed to conduct, thereby setting the electrode XH of the coordinates input section 22 at a high level (5 V) while holding the electrode YL at a low level (ground potential) through a resistor $\beta$. Under these circumstances, when pressure is applied to the coordinates input section 22, a high voltage is input to the A/D converter 23. The pressure applied to the coordinates input section 22 is sensed only when the input high voltage is not lower than the reference voltage of, for example, 4.9 V. This reference voltage value is set for this embodiment only, and a different value may be set as the reference voltage. Setting the reference voltage closer to 5 V will improve the accuracy, but it will in turn require the application of a higher pressure to the coordinates input section 22 if the pressure is to be sensed.

Based on the above input voltage level, correction is made to the reference voltage VREF for the x-axis. The voltage VINX1, i.e. the input voltage, represents the voltage applied to the electrode YL. This voltage varies with the pressure applied to the coordinates input section 22; the input voltage decreases as the pressure is reduced. Therefore, the CPU 24 looks up the table as shown in Table 1 and changes the data to be set in the register 28 of the reference voltage regulating circuit 27 so that the reference voltage VREF for the A/D converter 23 becomes equal to the input voltage VINX1.

The period W2 is the period for detecting the x coordinate. During the period W2, the transistors TB and TC are both allowed to conduct, thereby setting the electrode XH of the coordinates input section 22 at a high level (the x-axis correction voltage VINX1) and the electrode XL at a low level (ground potential). The resistance between the electrodes XH and XL is therefore divided in the ratio of c:d according to the position being pressed by the pen 29, so that an x-axis measuring voltage VINX is applied to the electrode YL.

$$VINX = VINX1 \times d/(c+d) \quad \text{[Equation 6]}$$

Here, since the reference voltage VREF is made equal to the voltage VINX1 as described above, the A/D converter 23 outputs 8-bit data, DI00–DI07, which corresponds to d/(c+d), to the CPU 24. Based on the supplied data DI00–DI07, the CPU 24 calculates the x-axis coordinate.

The period W3 is the period for measuring the y-axis correction voltage VINY1. During the period W3, first the transistor TA alone is allowed to conduct, thereby setting the electrode YH of the coordinates input section 22 to a high level (5 V) while holding the electrode XL at a low level (0 V) through a resistor $\alpha$, in a similar manner to the measurement of the x-axis correction voltage VINX1. Under these circumstances, since the coordinates input section 22 is being pressed by the pen 29, the y-axis correction voltage VINY1 is applied to the electrode XL, and this voltage is detected by the A/D converter 23. Thereafter, the CPU 24 looks up the table as shown in Table 1 and changes the data to be set in the register 28 of the reference voltage regulating circuit 27 so that the reference voltage VREF becomes equal to the y-axis correction voltage VINY1.

The period W4 is the period for detecting the y coordinate. During the period W4, the transistors TA and TD are both allowed to conduct, thereby setting the electrode YH of the coordinates input section 22 at a high level (the y-axis correction voltage VINY1) and the electrode YL at a low level (0 V). The resistance between the electrodes YH and YL is therefore divided in the ratio of a:b according to the position being pressed by the pen 29, so that a y-axis measuring voltage VINY is applied to the electrode XL.

$$VINY = VINY1 \times b/(a+b) \quad \text{[Equation 7]}$$

Here, since the reference voltage VREF is made equal to the voltage VINY1, the A/D converter 23 outputs 8-bit data, DI00–DI07, which corresponds to b/(a+b), to supply to the CPU 24. Based on the supplied data DI00–DI07, the CPU 24 calculates the y-axis coordinate.

Table 2 below shows the on/off states of the transistors TA, TB, TC, and TD for the periods W1–W4.

TABLE 2

| Period | Transistors | | | | Measuring voltage |
|---|---|---|---|---|---|
| | TA | TB | TC | TD | |
| W1 | OFF | ON | OFF | OFF | VINX1 |
| W2 | OFF | ON | ON | OFF | VINX |
| W3 | ON | OFF | OFF | OFF | VINY1 |
| W4 | ON | OFF | OFF | ON | VINY |

With the periods W1 to W4 shown in FIG. 4, the detection operation for one data (one set of coordinates) is complete. In the coordinates input device 21 of this invention, the maximum voltage applied to the coordinates input section 22 varies in a delicate manner depending on the condition of the applied pressure each time the coordinates input section 22 is pressed. During the periods W1 and W3, this maximum voltage is detected and correction is made so that the reference voltage VREF for the A/D converter 23 becomes equal to the maximum voltage.

Figure 5A:
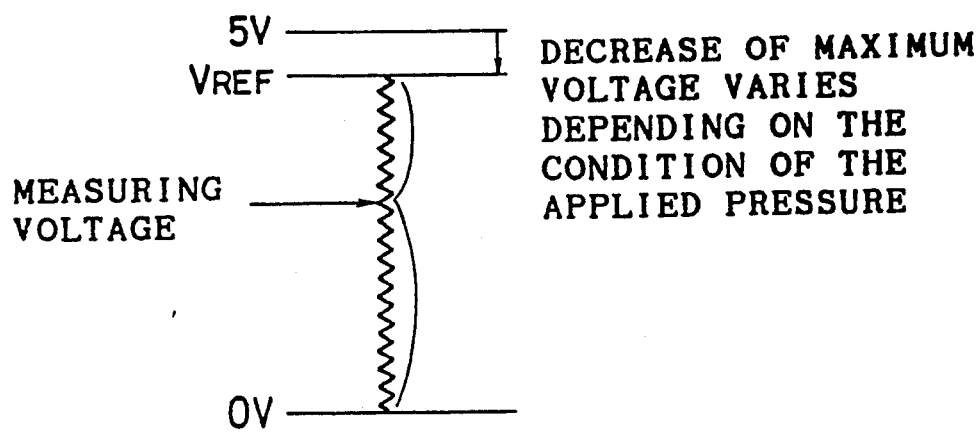
FIGS. 5(1) and 5(2) are diagrams explaining operations of the coordinates input device 21.
Figure 5B:
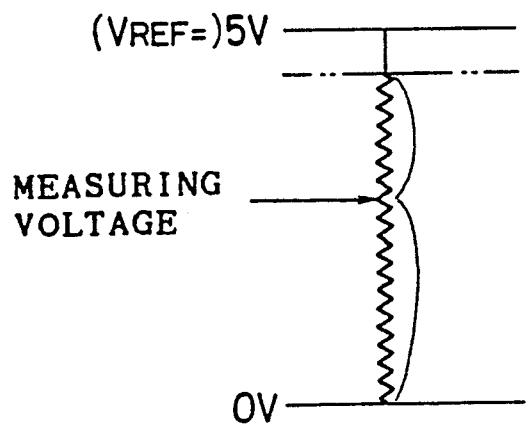

The maximum voltage applied to the coordinates input section 22 may drop below 5 V depending on the condition of the applied pressure, as shown in FIG. 5(1). In the prior art coordinates input device 1, the reference voltage VREF for the A/D converter 3 is fixed to 5 V, as shown in FIG. 5(2), and therefore, voltage is measured through the resistance divided without considering the effect of the maximum voltage decrease resulting from the condition of the pressure applied to the coordinates input section 2. As a result, the measured voltage is slightly higher than the actual voltage, which results in a difference between the calculated coordinates and the actual coordinates of the pressed point.

By contrast, in the present embodiment of the invention, since the reference voltage VREF for the A/D converter 23 is lowered to match the drop in the maximum voltage, the effect of the voltage drop resulting from the condition of the pressure applied to the input coordinates section 22 is eliminated, thereby achieving the measurement of voltage through the resistance divided precisely at the point pressed with the pen 29.

As described, according to the present embodiment, each time the x or y coordinate is detected, correction is made so that the reference voltage VREF for the A/D converter 23 becomes equal to the maximum voltage applied to the coordinates input section 22, thereby achieving the measurement of voltage through the resistance divided precisely at the pressed point and thus ensuring the detection of the coordinates with high accuracy.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A coordinates input device which includes a coordinates input section comprising a pair of plane resistive sheets having electrodes formed along opposite edges thereof, the plane resistive sheets being disposed so that the electrodes of one of the plane resistive sheets extend at right angles with the electrodes of the other one of the plane resistive sheets and so that the plane resistive sheets are brought into contact with each other when pressure is applied to any point on one of the plane resistive sheets, wherein the first and second electrodes of each of the plane resistive sheets are respectively connected to a predetermined reference potential and a ground potential through switching means, the switching means being so controlled as to provide a gradient potential to one of the plane resistive sheets while placing the switching means connected to the other one of the plane resistive sheets in a high impedance state, whereupon the potential of the plane resistive sheet connected to the switching means placed in the high impedance state is detected, based upon which the coordinates of the pressed point are calculated, the coordinates input device comprising:

analog-digital converting means which detects the potential of the plane resistive sheet placed in the high impedance state for calculation of the coordinates and which converts the potential to digital data on the basis of the reference potential:

said analog to digital converter means being responsive to said switching means for also detecting, prior to the calculation of the coordinates, the maximum potential applied to the coordinates input section when the plane resistive sheets are pressed together; and reference potential regulating means for regulating the reference potential supplied to the analog-digital converting means to the same level as the maximum potential.

2. A coordinates input device as set forth in claim 1, wherein the reference voltage potential regulating means comprises:

a plurality of resistors having different resistances and connected in series in increasing order of resistance;

a plurality of switching elements connected respectively in parallel with the plurality of resistors;

a memory for storing control data used for controlling the on/off operations of the plurality of switching elements; and a control circuit for controlling the plurality of switching elements on the basis of the control data stored in the memory, wherein the reference potential is applied to one end of the smallest resistance resistor of the plurality of resistors and the potential at one end of the largest resistance resistor is supplied as the maximum potential to the analog-digital converting means.

3. A coordinates input device as set forth in claim 2, wherein the plurality of switching elements each includes a p-channel transistor and an n-channel transistor paired together.

4. A coordinates input device as set forth in claim 1, wherein the the analog to digital converter means when detecting the maximum potential, detects the potential at the second electrode of one of the plane resistive sheets when the first electrode of the one plane resistive sheet is set at the reference potential and the second electrode of the other one of the plane resistive sheets is set at the ground potential.

5. A coordinates input method wherein a coordinates input section is provided comprising a pair of plane resistive sheets having electrodes formed along opposite edges thereof, the plane resistive sheets being disposed so that the electrodes of one of the plane resistive sheets extend at right angles with the electrodes of the other one of the plane resistive sheets and so that the plane resistive sheets are brought into contact with each other when pressure is applied to any point on one of the plane resistive sheets, wherein the first and second electrodes of each of the plane resistive sheets are respectively connected to a predetermined reference potential and a ground potential through switching means, the switching means being so controlled as to provide a gradient potential to one of the plane resistive sheets while placing the switching means connected to the other one of the plane resistive sheets in a high impedance state, whereupon the potential of the plane resistive sheet connected to the switching means placed in the high impedance state is detected, based upon which the coordinates of the pressed point are calculated, the coordinates input method comprising the steps of:

detecting, prior to the calculation of the coordinates, a maximum potential applied to the coordinates input section when the plane resistive sheets are pressed together;

detecting the analog potential of the plane resistive sheet placed in the high impedance state for calculation of the coordinates;

converting said detected analog potential to digital data based on said maximum potential; and calculating the coordinates of the pressed point on the basis of the digital data.

6. A coordinates input method as set forth in claim 5, wherein, when the first electrode of one of the plane resistive sheets is set at the reference potential and the second electrode of the other one of the plane resistive sheets is set at the ground potential, the potential at the second electrode of the one plane resistive sheet is detected as the maximum potential.

* * * * *